United States Patent
Hirano et al.

(10) Patent No.: US 6,957,900 B2
(45) Date of Patent: Oct. 25, 2005

(54) GLASS REFLECTOR FOR PROJECTOR AND MANUFACTURING METHOD FOR THE SAME

(75) Inventors: Naomi Hirano, Tokyo (JP); Hiroshi Momoi, Chiba (JP); Hiroyasu Nishio, Chiba (JP); Nobuhisa Takada, Osaka (JP)

(73) Assignee: Asahi Techno Glass Corporation, Funabashi (JP)

( * ) Notice: Subject to any disclaimer, the term of this patent is extended or adjusted under 35 U.S.C. 154(b) by 0 days.

(21) Appl. No.: 10/722,412

(22) Filed: Nov. 28, 2003

(65) Prior Publication Data

US 2004/0264200 A1   Dec. 30, 2004

(30) Foreign Application Priority Data

Jun. 26, 2003 (JP) .............................. 2003-182340

(51) Int. Cl.⁷ ............................................. F21V 7/00

(52) U.S. Cl. ....................... 362/296; 362/341; 313/113; 359/869

(58) Field of Search ........................ 362/296, 347–350, 362/341; 359/868–869; 313/113; 428/410

(56) References Cited

U.S. PATENT DOCUMENTS

| | | | | | |
|---|---|---|---|---|---|
| 3,541,825 A | * | 11/1970 | Reader et al. | .................. | 72/60 |
| 3,825,742 A | * | 7/1974 | Levin | .......................... | 362/296 |
| 4,499,526 A | * | 2/1985 | Tarnay | ........................ | 362/263 |
| 5,438,448 A | * | 8/1995 | Nishimura et al. | .......... | 359/214 |
| 5,858,046 A | * | 1/1999 | Allen et al. | ...................... | 65/66 |
| 6,306,010 B1 | * | 10/2001 | West et al. | .................... | 451/36 |
| 6,492,031 B1 | * | 12/2002 | Moriyama et al. | ........... | 428/458 |
| 6,814,453 B2 | * | 11/2004 | Miwa et al. | ................. | 359/853 |

FOREIGN PATENT DOCUMENTS

JP        2004-352559        12/2004

* cited by examiner

Primary Examiner—Stephen Husar
Assistant Examiner—Jason Han
(74) Attorney, Agent, or Firm—Oblon, Spivak, McClelland, Maier & Neustadt, P.C.

(57) ABSTRACT

For example, the reflector according to the present invention is a reflector made of glass for a projector which is composed of amorphous glass whose thermal expansion coefficient is 30 to $45 \times 10^{-7}/°$ C. and includes a reflective surface for reflecting light emitted from a light source and an opening for inserting a light source bulb or a conductor to the light source bulb, in which the opening is smoothed by heat-treating the surface thereof after opening-drilling, thus mechanical damage is removed from the processed part.

15 Claims, 7 Drawing Sheets

| glass | Embodiment1 | | Embodiment2 | | Embodiment3 | | Comparison Ex.1 | | Comparison Ex.2 | | Comparison Ex.3 |
|---|---|---|---|---|---|---|---|---|---|---|---|
| | A | B | A | B | A | B | A | B | A | B | crystallized |
| Mechanical damage | none | none | none | none | none | none | occur | occur | occur | occur | occur |
| Reflective surface accuracy(±μm) | 16 | 18 | 12 | 13 | 16 | 18 | 13 | 13 | 16 | 17 | 70 |
| Mean intensity of illumination of each projection face(1x) | 5331 | 5256 | 5251 | 5255 | 5228 | 5181 | 5280 | 5250 | 5209 | 5181 | 5046 |
| | 106% | 104% | 104% | 104% | 104% | 103% | 105% | 104% | 103% | 103% | 100% |
| Lighting evaluation (450°C) | | | | | | | | | | | |
| 50H | 0/10 | 0/10 | 0/10 | 0/10 | 0/10 | 0/10 | 0/10 | 0/10 | 0/10 | 0/10 | 0/10 |
| 100H | 0/10 | 0/10 | 0/10 | 0/10 | 0/10 | 0/10 | 0/10 | 0/10 | 0/10 | 0/10 | 0/10 |
| 300H | 0/10 | 0/10 | 0/10 | 0/10 | 0/10 | 0/10 | 0/10 | 0/10 | 0/10 | 0/10 | 0/10 |
| 500H | 0/10 | 0/10 | 0/10 | 0/10 | 0/10 | 0/10 | 0/10 | 0/10 | 0/10 | 0/10 | 0/10 |
| 1000H | 0/10 | 0/10 | 0/10 | 0/10 | 0/10 | 0/10 | 1/10 | 1/10 | 1/10 | 1/10 | 0/10 |
| 1500H | 0/10 | 0/10 | 0/10 | 0/10 | 0/10 | 0/10 | 2/10 | 3/10 | 1/10 | 1/10 | 0/10 |
| 2000H | 0/10 | 0/10 | 0/10 | 0/10 | 0/10 | 1/10 | 2/10 | 3/10 | 2/10 | 1/10 | 0/10 |
| Lighting evaluation (550°C) | | | | | | | | | | | |
| 50H | 0/10 | 0/10 | 0/10 | 0/10 | 0/10 | 0/10 | 3/10 | 5/10 | 4/10 | 6/10 | 0/10 |
| 100H | 0/10 | 0/10 | 0/10 | 0/10 | 0/10 | 0/10 | 10/10 | 10/10 | 10/10 | 9/10 | 0/10 |
| 300H | 0/10 | 0/10 | 0/10 | 0/10 | 0/10 | 0/10 | 10/10 | 10/10 | 10/10 | 10/10 | 0/10 |
| 500H | 0/10 | 0/10 | 0/10 | 0/10 | 0/10 | 0/10 | 10/10 | 10/10 | 10/10 | 10/10 | 0/10 |
| 1000H | 0/10 | 0/10 | 0/10 | 0/10 | 0/10 | 0/10 | 10/10 | 10/10 | 10/10 | 10/10 | 0/10 |
| 1500H | 0/10 | 0/10 | 0/10 | 1/10 | 0/10 | 1/10 | 10/10 | 10/10 | 10/10 | 10/10 | 0/10 |
| 2000H | 0/10 | 1/10 | 1/10 | 2/10 | 0/10 | 1/10 | 10/10 | 10/10 | 10/10 | 10/10 | 0/10 |

Fig. 5

Embodiment 1(A)
borosilicate glass

Fig. 6

Comparison Example 3
crystallized glass

Fig. 7

Fig. 8

GLASS REFLECTOR FOR PROJECTOR AND MANUFACTURING METHOD FOR THE SAME

CROSS-REFERENCE TO RELATED APPLICATION

This application is based upon and claims the benefit of priority from the prior Japanese Patent Application No. 2003-182340, filed on Jun. 26, 2003, the entire contents of which are incorporated herein by reference.

BACKGROUND OF THE INVENTION (1) Field of the Invention

The present invention relates to a glass reflector used together with the light source for a high-voltage mercury discharge lamp and a manufacturing method therefor and more particularly to a glass reflector suitable for the light source for a projector such as a liquid crystal projector or a DLP projector and a manufacturing method therefor.

(2) Description of the Related Art

As a light source for a liquid crystal projector and a DLP projector (hereinafter, these are all referred to as a projector), in the early stage, a combination of a halogen lamp and a reflector made of heat-resisting glass such as borosilicate glass is used. However, in recent years, an HID lamp (a discharge lamp) excellent in the respects of the brightness of a projected image, a light color closer to white, and a life span of the lamp has been substituted for it. To this substitution, the progress in miniaturization and high output of a discharge lamp contributes.

Projectors, in correspondence with the spread of video instruments such as a personal computer and a DVD, are widely used from business presentation to household. Therefore, simultaneously with progress of miniaturization of a projector itself, there are increasing requests for preventing the brightness from impairment, that is, preventing a lamp from reduction in the output thereof. An increase in the output of a lamp causes an increase in the amount of heat from the lamp, and the temperature of the light source extremely rises also due to the effect of miniaturization of the projector frame, and the neck of the reflector may be at more than 600° C.

In a conventional projector, the highest temperature of the glass face is about 400 to 450° C. However, in a recent projector, the highest temperature of the glass face rises to 450 to 550° C. Therefore, as a projector, instead of a conventional reflector made of heat-resisting glass such as borosilicate glass, a reflector made of glass-ceramic glass of low thermal expansion excellent in heat resistance is widely used (for example, refer to Japanese Patent Publication 7-37334).

The reason is that there is a possibility that the rise temperature of a reflector may exceed the transformation point of borosilicate glass conventionally used and it is believed that at 550° C., a conventional reflector made of borosilicate glass has a high probability of cracking.

On the other hand, a reflector made of glass is manufactured by press-molding molten glass using a mold manufactured on the basis of a desired optical design.

Meanwhile, a reflector for a light source is required to be provided with an opening for inserting and fixing a light source lamp at the top of the reflective surface. The opening is formed by forming a neck on the rear side of the reflective surface along the optical axis of the reflector during press-molding, cutting it, and making an opening. It is well known that a reflector for a halogen lamp is punched to make an opening and then the neighborhood of the opening is rounded by a flame of a burner (refer to Japanese Utility Model Patent 2568541).

However, it is related to a reflector for a halogen lamp and not related to a reflector for a projector and the temperature of the glass surface is not increased so high.

BRIEF SUMMARY OF THE INVENTION

An object of the present invention is to provide a glass reflector for a projector which is inexpensive and heat resisting even when the temperature of the glass surface thereof rises very high and has a reflective surface excellent in accuracy and a manufacturing method therefor.

The present invention provides a reflector made of glass for a projector which is composed of amorphous glass whose thermal expansion coefficient is 30 to $45 \times 10^{-7}$/° C. and includes a reflective surface for reflecting light emitted from a light source and an opening for inserting a light source bulb or a conductor to the light source bulb, in which the opening is smoothed by heat-treating the surface thereof after opening-drilling, thus mechanical damage is removed from the processed part.

The present invention provides a manufacturing method for a reflector made of glass for a projector including a reflective surface for reflecting light emitted from a light source and an opening for inserting a light source bulb or a conductor to the light source bulb, comprising the press-molding step of press-molding molten glass in a predetermined reflector shape by a mold having a bottom mold and a plunger, the opening forming step of forming the opening by removing the glass at the part touching the opening of the reflector formed by the press-molding step, and the surface smoothing step of heat-treating the opening formed by the opening forming step to smooth the surface thereof, thereby removing mechanical damage from the processed part.

DETAILED DESCRIPTION OF THE INVENTION (First Embodiment)

The first embodiment of the present invention will be explained hereunder by referring to the accompanying drawings. As glass of the reflectors of the embodiment and comparison example, two kinds of glass (A) and (B) having the components indicated below are used. % indicates a weight percentage.

(A) $SiO_2$: 80.9%, $Al_2O_3$: 2.3%, $Na_2O$: 4%, $B_2O_3$: 12.7%, thermal expansion coefficient (at 0 to 300° C.): $32.5 \times 10^{-7}$/° C.

(B) $SiO_2$: 78%, $Al_2O_3$: 2.1%, $Na_2O$: 5.2%, $B_2O_3$: 14.5%, thermal expansion coefficient (at 0 to 300° C.): $38 \times 10^{-7}$/° C.

Further, the samples of the embodiment and comparison example are deformed reflectors having an external size of 50 mm (length) by 50 mm (width) viewed in the direction of the optical axis and a rotational elliptical surface at a focal distance F of 6 mm. The neck length is 5 mm from the boundary line with the reflective surface, and the thickness in the neighborhood of the focus is 4.5 mm, and the inside diameter of the neck (the opening face diameter) is 10 mm, and the opening diameter is 9 mm.

<Embodiment 1>

Figure 4:
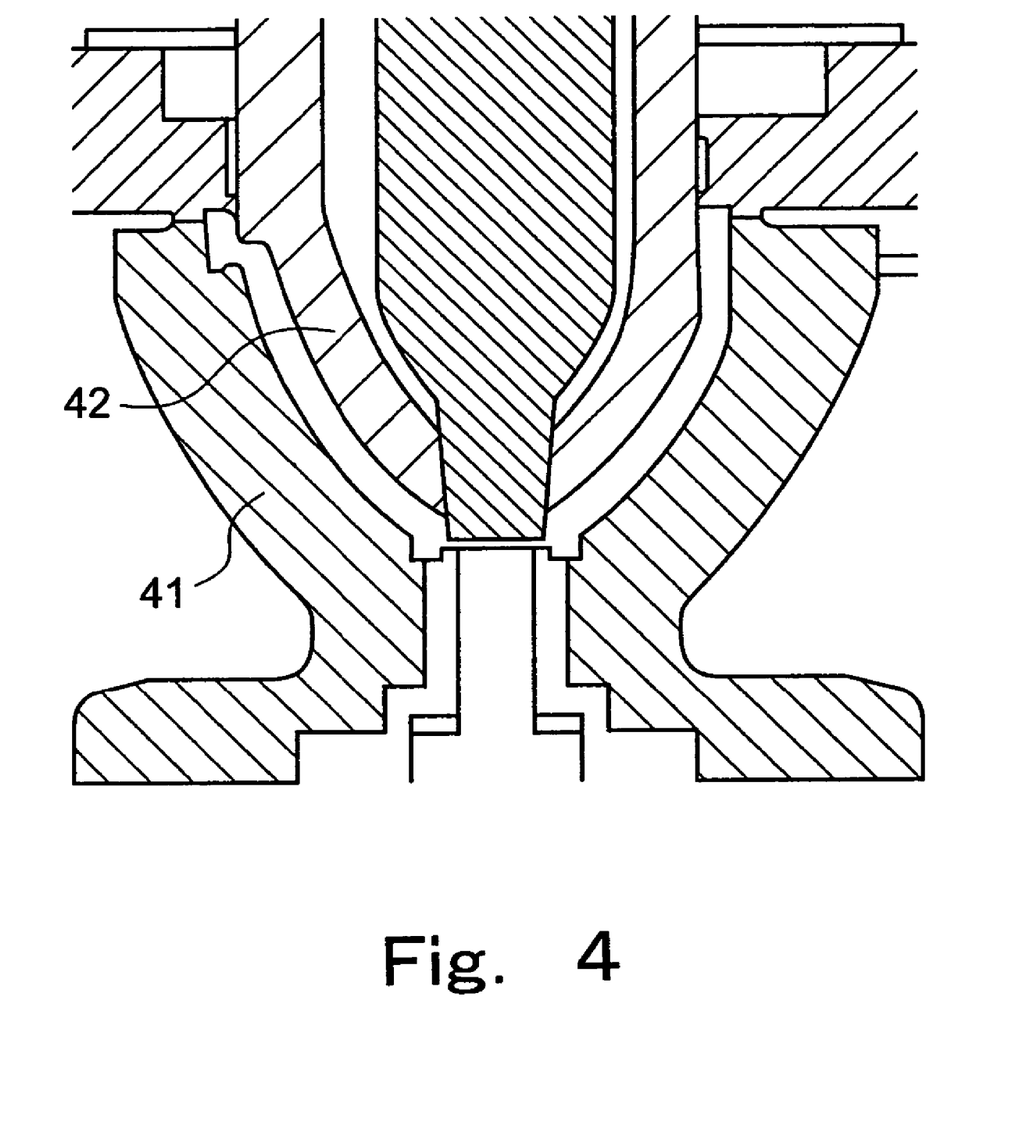
FIG. 4 is a drawing showing the structure of a mold used for press molding of the reflectors of the embodiments of the present invention.

In Embodiment 1, the raw materials are mixed so as to obtain the above glass composition and melted at about 1600° C. and a glass gob in a predetermined weight is dropped into a bottom mold 41 shown in FIG. 4, compressed by a plunger 42 from above, and pressed to a reflector shape having the above dimensions. (Further, the same may be said with Embodiment 2 and Comparison Example 1 which will be described later.)

At the time of pressing, when the glass gob is compressed until the glass temperature lowers under about 800° C., there is an advantage that the transfer accuracy of the plunger shape which is a reflective surface is good and the accuracy of the reflective surface can be made good.

The reflector pressed as mentioned above is shown in FIG. 1A. In Embodiment 1, for pressing, a thickness d1 of an opening scheduled part 11 is preferably 1.5 mm or less. Therefore, the gap between the molds is designed so as to make the thickness d1 equal to or less than 1.5 mm and for example, the thickness is set to 1.2 mm.

Further, when the thickness of the opening part is more than 1.5 mm, heating during punching takes a lot of time, and the opening is burred, and the punch life is shortened, so that it is not preferable. Further, in this kind of glass, when molten glass is to be pressed, as glass becomes thinner due to contact with the mold, the glass is solidified because heat is quickly taken, so that actually, a thickness of about 1 mm is generally a limit of molding.

Figure 1A:
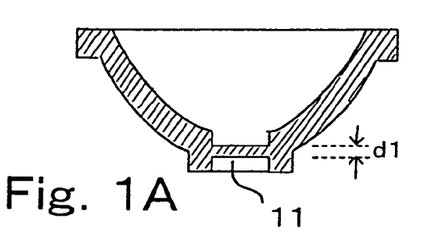
FIGS. 1A–1E are drawings for explaining the steps of manufacturing a reflector by Embodiment 1 of the present invention.

Further, the opening scheduled part 11 is desirably installed in a position dented from the reflective surface. This part is heated during punching and is applied with a flame by subsequent fire polish, so that a step part is provided between the opening part and the reflective surface, thus the effect of heating on the accuracy of the reflective surface can be reduced.

Figure 1B:
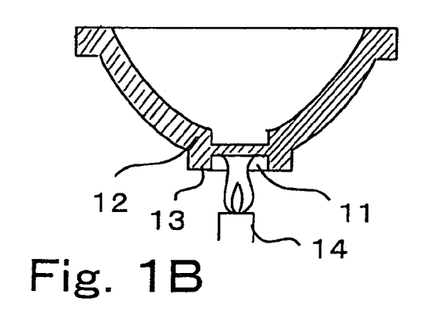
Figure 1C:
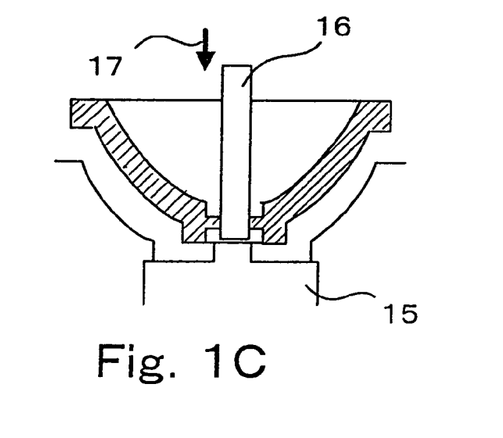

Next, as shown in FIG. 1B, the interval between a side 13 of a neck 12 which is not the reflective surface and the opening scheduled part 11 is applied with a flame by a burner 14 to soften the glass. Thereafter, as shown in FIG. 1C, the reflector is loaded on a die 15, and the opening scheduled part 11 is punched by a punch 16 in the direction of the reflective surface of the reflector as shown by an arrow 17, and an opening 18 is formed (direct punching). The temperature of the glass of the opening during punching is equal to or higher than the softening point and the viscosity is about 300 to 500 Pa.s (3000 to 5000 P).

Figure 1D:
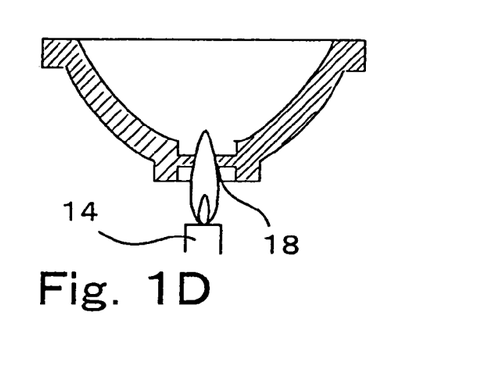
Figure 1E:
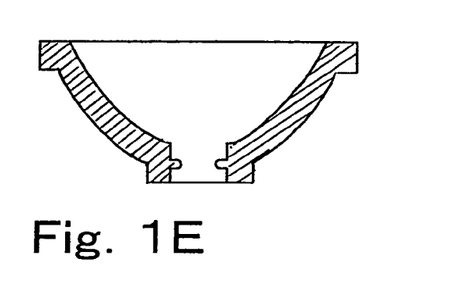

Thereafter, as shown in FIG. 1D, the interval between the side 13 of the neck 12 which is not the reflective surface and an opening 18 is fire-polished. Namely, the interval is uniformly applied with a flame by the burner 14 to melt the glass surface again and make it round and smooth. The time required for applying a flame is about 3 to 5 seconds per each. Each fire-polished reflector is eliminated thereafter by an annealing kiln to obtain a sample substrate (FIG. 1E).

<Embodiment 2>

Figure 2A:
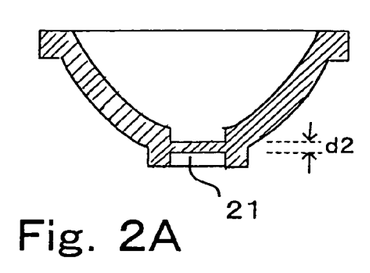
FIGS. 2A–2D are drawings for explaining the steps of manufacturing a reflector by Embodiment 2 of the present invention.

In Embodiment 2, each sample substrate is drilled an opening, for example, by a diamond core drill 26. Namely, it is pressed as shown in FIG. 4 to obtain a press-molded reflector as shown in FIG. 2A. At the time of pressing, a thickness d2 of an opening scheduled part 21 of the reflector is thicker than the thickness d1 of the opening scheduled part 11 in Example 1.

Figure 2B:
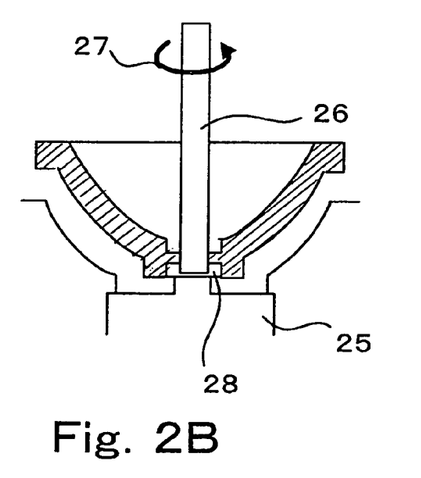

The reflector is loaded on a die 25, applied with the core drill 26 from the reflective surface side, and rotated in the direction of an arrow 27, thus an opening is drilled in the opening scheduled part 21 to form an opening 28 (FIG. 2B).

Figure 2C:
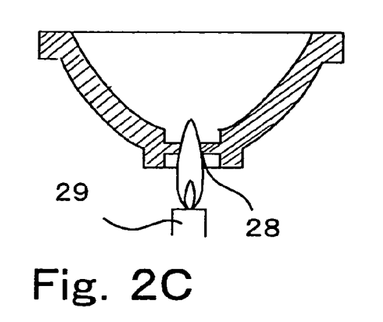
Figure 2D:
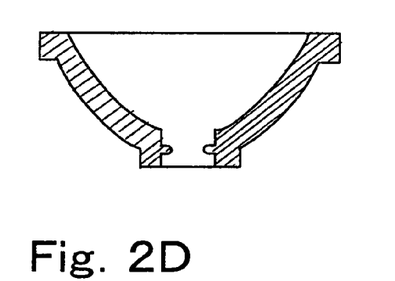

Next, as shown in FIG. 2C, the opening 28 is applied with a flame of a burner 29 to melt the glass surface into a round and smooth state and then slowly cooled by the annealing kiln (FIG. 2D).

<Embodiment 3>

Figure 3A:
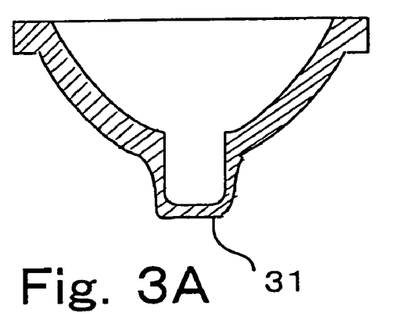
FIGS. 3A–3D are drawings for explaining the steps of manufacturing a reflector by Embodiment 3 of the present invention.
Figure 3B:
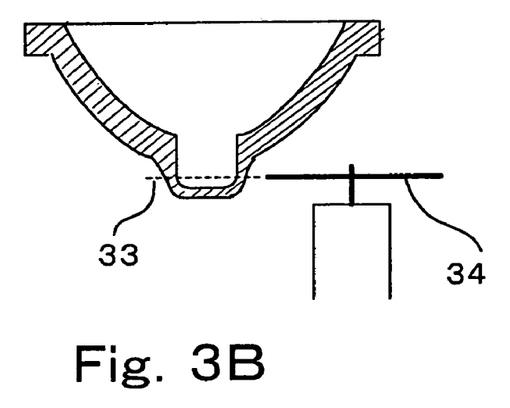

In Embodiment 3, using a mold having a neck slightly longer than those of Embodiments 1 and 2, a reflector with the rear end of the neck blocked is manufactured by pressing (FIG. 3A). Next, the reflector is eliminated and then the rear end of a neck 31 is cut and removed on the face perpendicular to the optical axis by a cutter 33 where the residual neck length is in the same position as that in Embodiments 1 and 2 (FIG. 3B).

Figure 3C:
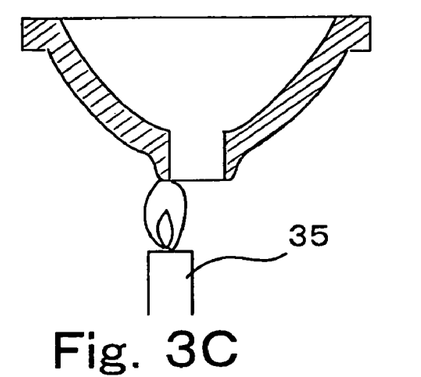
Figure 3D:
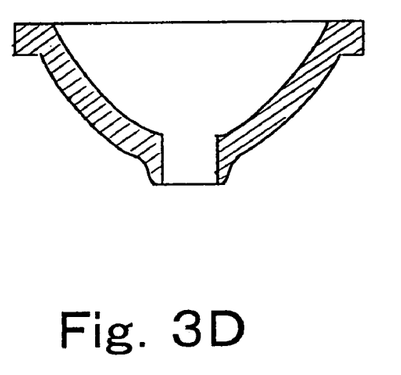

Next, a section 34, as shown in FIG. 3C, is applied with a flame by a burner 35 to be fire-polished and eliminated by the annealing kiln to obtain a sample substrate (FIG. 3D).

COMPARISON EXAMPLE 1

In Comparison Example 1, a reflector is manufactured by pressing borosilicate glass and eliminated, and then drilled with a core drill in the same way as with Embodiment 2 to form an opening, though it is not fire-polished thereafter.

COMPARISON EXAMPLE 2

In Comparison Example 2, a reflector using borosilicate glass with the rear end of the neck put into the blocked state is manufactured by pressing and eliminated in the same way as with Embodiment 3, and then drilled by cutting the rear end of the neck, though the processed surface is not fire-polished thereafter.

COMPARISON EXAMPLE 3

Comparison Example 3 is an example using glass-ceramic glass, which is made of glass-ceramic glass equivalent to that of Embodiment (1) of Japanese Patent Publication 7-37334 and in the same way as with Embodiment 3, a reflector is molded and then the rear end of the neck is cut and removed on the face perpendicular to the optical axis, though the section is not fire-polished thereafter.

In Comparison Example 3, concretely, the raw materials are mixed so as to obtain a composition of 60% of $SiO_2$, 21% of $Al_2O_3$, 5.5% of $Li_2O$, 4% of $TiO_2+ZrO_2$, 5% of $P_2O_5$, 2.5% of $B_2O_3$, 4% of $ZnO+MgO$, and 1.5% of $K_2O+Na_2O$, melted at 1500° C. to be vitrified, and formed in a substrate shape of a reflector by pressing.

The glass molded part is held at 57° C. for 1 hour, then heated up to 770° C. at a rise temperature of 3° C. per minute, held at this temperature for 1 hour, and then cooled. The transparent molded part before heat treatment is changed to milky-white and becomes a β-spodumene solid solution. The glass-ceramic glass has a thermal expansion coefficient of $6 \times 10^{-7}$/° C.

Therefore, on the inner periphery of the neck of each of the reflectors produced in Embodiments 1 and 2 and Comparison Example 1, a ring projection remains, while on the inner periphery of the neck of each of the reflectors produced in Embodiment 3 and Comparison Examples 2 and 3, there is no ring projection.

As mentioned above, on the reflective surface of each of the reflector substrates produced in the embodiments and comparison examples, reflective films are formed by alternately laminating a $TiO_2$ film and an $SiO_2$ film up to 30 layers by vacuum vapor deposition to produce a reflector sample.

<Evaluation Results of Embodiments and Comparison Examples>

Figure 5:
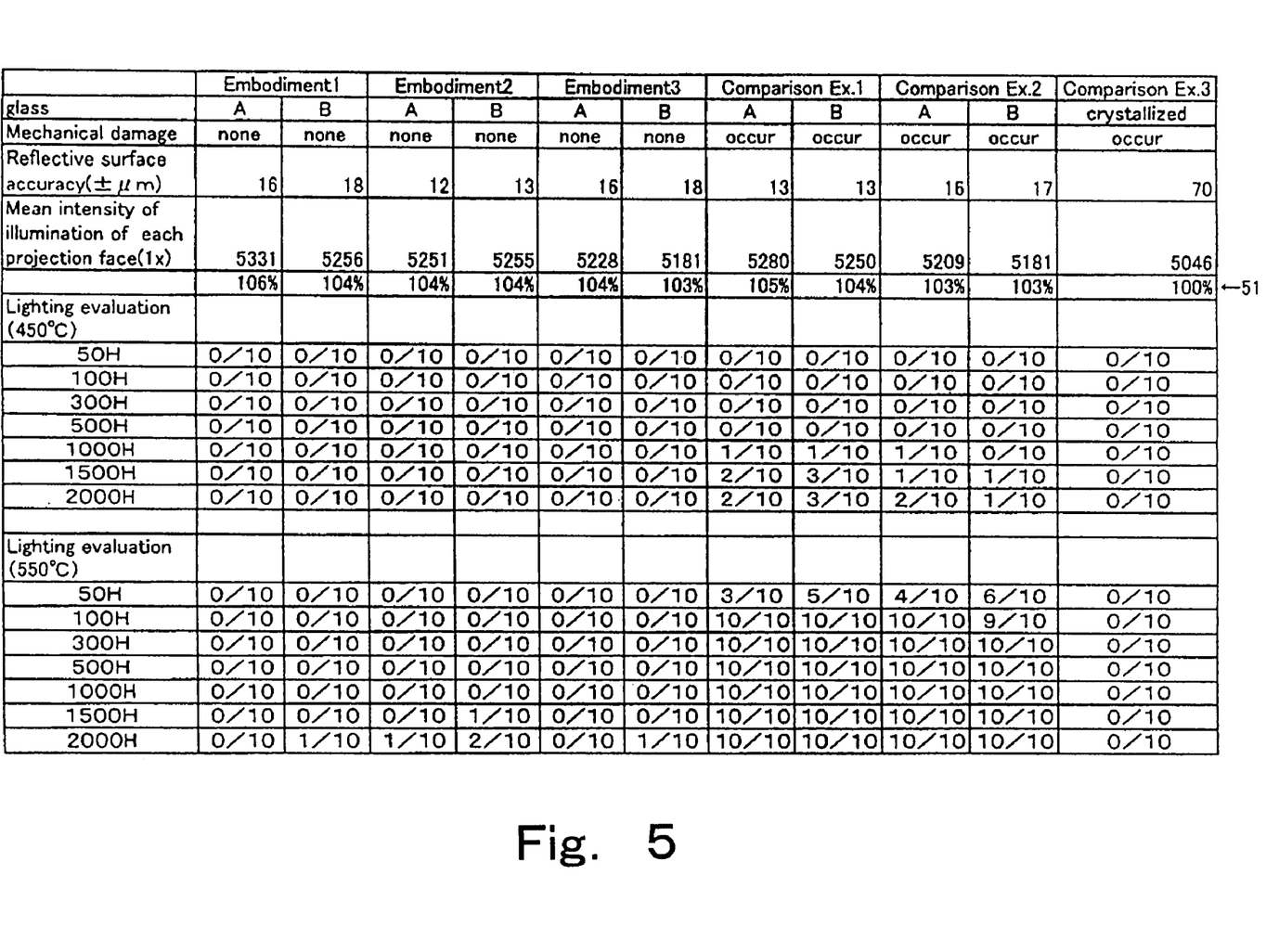
FIG. 5 is a drawing showing the measured results of the properties of the embodiments of the present invention and comparison examples.

The evaluation results of the embodiments and comparison examples are shown in FIG. 5 indicating the mean value of each ten samples. Further, the column of No. 51 shown in the table indicates the ratio of the mean intensity of illumination of each projection face of each embodiment and comparison example to the mean intensity of illumination of each projection face of Comparison Example 3.

(1) Existence of Mechanical Damage of Processed Parts

Firstly, burrs, cuts, and roughened surfaces of processed parts are observed visually. The reflectors of the embodiments have all round and smooth surfaces free of burrs and cuts. On the other hand, the processed surfaces of the comparison examples have roughened surfaces in a ground glass shape with machining traces recognized and fine cuts are recognized at the edge of each opening.

Next, a laser beam is radiated to each surface of the processed parts and scattered light is observed. In the reflectors of the embodiments, scattered light caused by cracking is not recognized because mechanical damage has been minimized or removed from the processed parts.

(2) Surface Toughness of Processed Parts

The surface roughness of the processed part of each sample is measured using a feeler type surface roughness meter. In Embodiments 1 and 2 and Comparison Example 1, each reflector is divided into two parts along the optical axis, and the inner peripheral surface of the neck is exposed, and the inner peripheral surface of the opening is measured in an extent of 1 mm in the direction of the optical axis, and in Comparison Examples 2 and 3, the end face of each neck is measured along the section.

In each embodiment, the mean roughness Ra is 0.01 to 0.03 µm, while each comparison example has a rough surface having mean roughness Ra of about 1 µm and irregularities of 17 to 18 µm at maximum.

(3) Reflective Surface Accuracy

The reflective surface of each sample is measured in the radial direction using a feeler type three-dimensional shape measuring instrument and the accuracy for the designed value of the reflective surface is ±10 to 15 µm in Embodiments 1, 2, and 3 and Comparison Examples 1 and 2. On the other hand, in Comparison Example 3, it is ascertained that there is a variation of about ±70 µm.

Generally, according to the present invention, the surface accuracy in the neighborhood of the opening is preferably less than ±20 µm for an ideal curved surface. The neighborhood of the opening in this case means a range up to about 20 mm from the end of the opening in the radial direction.

Figure 6:
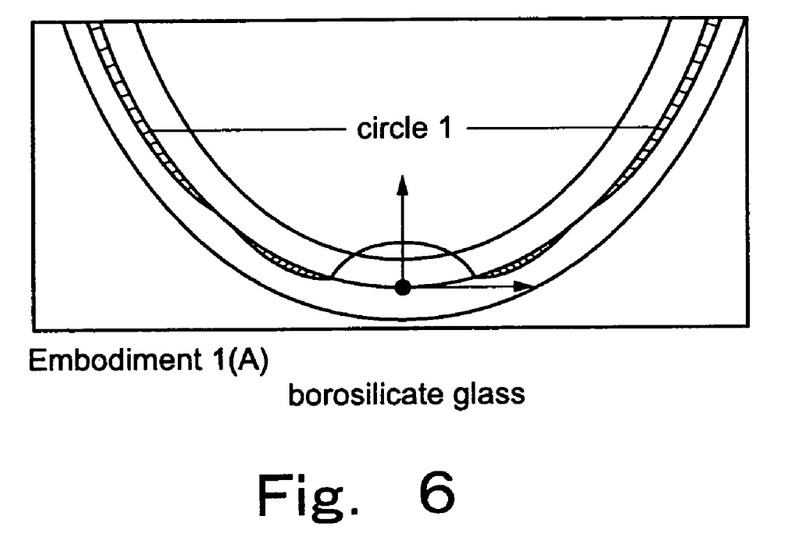
FIG. 6 is a drawing showing the measured results of the three-dimensional shape of the reflective surface of the reflecting substrate of Embodiment 1(A) of the present invention.
Figure 7:
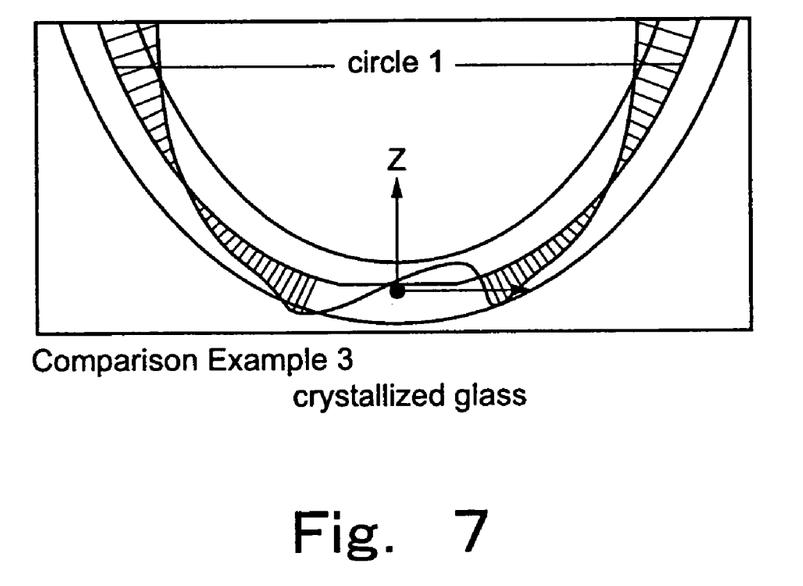
FIG. 7 is a drawing showing the measured results of the three-dimensional shape of the reflective surface of the reflecting substrate of Comparison Example 3.

The three-dimensional measured results of Embodiment 1(A) and Comparison Example 3 are shown in FIGS. 6 and 7. In the drawings, the measured values displayed are enlarged in the normal line direction at each measuring point for an ideal curved surface (curved line). The curved line of the reflective surface (measured values) is enlarged 50 times and displayed and the distances between the center line and the upper and lower lines are respectively 50 µm.

(4) Lighting Evaluation

An extra-high voltage mercury lamp (UHP; Registered Trademark) of 150 W is loaded in the reflector of each sample, and a motor driven fan with a diameter of 1 cm is installed at a distance of 10 cm from the neck of the reflector, and the temperature of the neck of the reflector is measured by a thermocouple, and simultaneously the air flow rate of the fan is controlled so that the temperature after temperature rise is made equal to a preset temperature (450° C., 550° C.), and lighting evaluation of repeating to light the lamp continuously for 2.5 hours and switch the lamp off for 0.5 hours is executed. The operation is performed for each 10 samples of each embodiment and comparison example.

As a result, the results shown in the table in FIG. 5 are obtained. In the lighting evaluation shown in FIG. 5, the numerator of each fraction means the number of cracked samples among 10 samples.

In the embodiments using glass (A) and Comparison Example 3, no reflectors are cracked after 2000 hours. On the other hand, in Comparison Examples 1 and 2, there are some samples cracked after 1000 hours at 450° C. and moreover, at 550° C., half of the 10 samples are cracked after 50 hours.

The reason is considered to be that in the embodiments of the present invention, mechanical damage is removed from the processed parts. In this case, removal of mechanical damage from the processed parts means a state that burrs and cracks caused by punching, cuts caused by mechanical processing, roughened surfaces, and minute cracks with a diameter of several tens µm or less on the surfaces do not exist.

(5) Intensity of Illumination of Projection Faces (1×)

On each reflector of Embodiments 1, 2, and 3 and Comparison Example 3 free of cracking in the lighting evaluation, an extra-high voltage mercury lamp (UHP) of 150 W is loaded, and they are mounted in an actual liquid crystal projector, and no-image light is projected onto the screen at a distance that the projection screen size is 40 inches diagonally, and the intensity of illumination is measured by an illumination photometer arranged at the center of each section of the projection face divided into 9 sections of 3×3 rows, and the brightness is evaluated.

As compared with the average of the intensity of the 9 sections, the measured values of each embodiment are all higher than the measured values of Comparison Example 3 by about 3 to 5%. With respect to the reflectors of the embodiments, as compared with the same optical system, the illumination difference between the central section and the peripheral sections is smaller than that of the reflector of Comparison Example 3 and comparatively uniform intensity of illumination is obtained including the peripheral part.

As a result, it can be judged that the reflectors of the present invention using no glass-ceramic glass are superior in the reflective surface accuracy.

Meanwhile, in the aforementioned embodiments, the surface treatment after the opening-drilling process is carried out by fire polishing. The use of fire polishing like this provides an advantage that the surface treatment after the opening-drilling process can be carried out easily.

(Other Embodiments)

However, the present invention is not limited to fire polishing and in place of it, a laser beam may be radiated to the concerned section to carry out heat treatment. In the other embodiment of the present invention, even if microcracks are generated on the opening-drilled surface, thereafter, a laser beam is radiated onto the section for heat treatment, so that the microcracks are eliminated. Therefore, in the subsequent processes or in the state that this reflector for a projector is loaded, even if the glass substrate is applied with mechanical or thermal stress, the glass can be prevented from careless cracking starting from the microcracks. Furthermore, the heat treatment is carried out by laser radiation, so that unlike chamfering, there is an advantage that the treating speed is fast.

Even when the surface treatment is carried out by a laser beam, at the previous steps, as shown in FIGS. 1 to 3, each sample is drilled by a core drill by fire-polishing and direct punching or an opening can be formed by a step of cutting by a cutter.

In the opening-drilling process as indicated in Embodiments 1 and 2, needless to say, a laser beam may be radiated only in one direction. However, the radiated surface is located inside the neck, so that at the time of radiation of a laser beam, when light is radiated in the two directions such as from the rear end side of the neck outside the reflector and the reflective surface side, cuts at the end part and cracks can be preferably removed surely in a short time.

Figure 8:
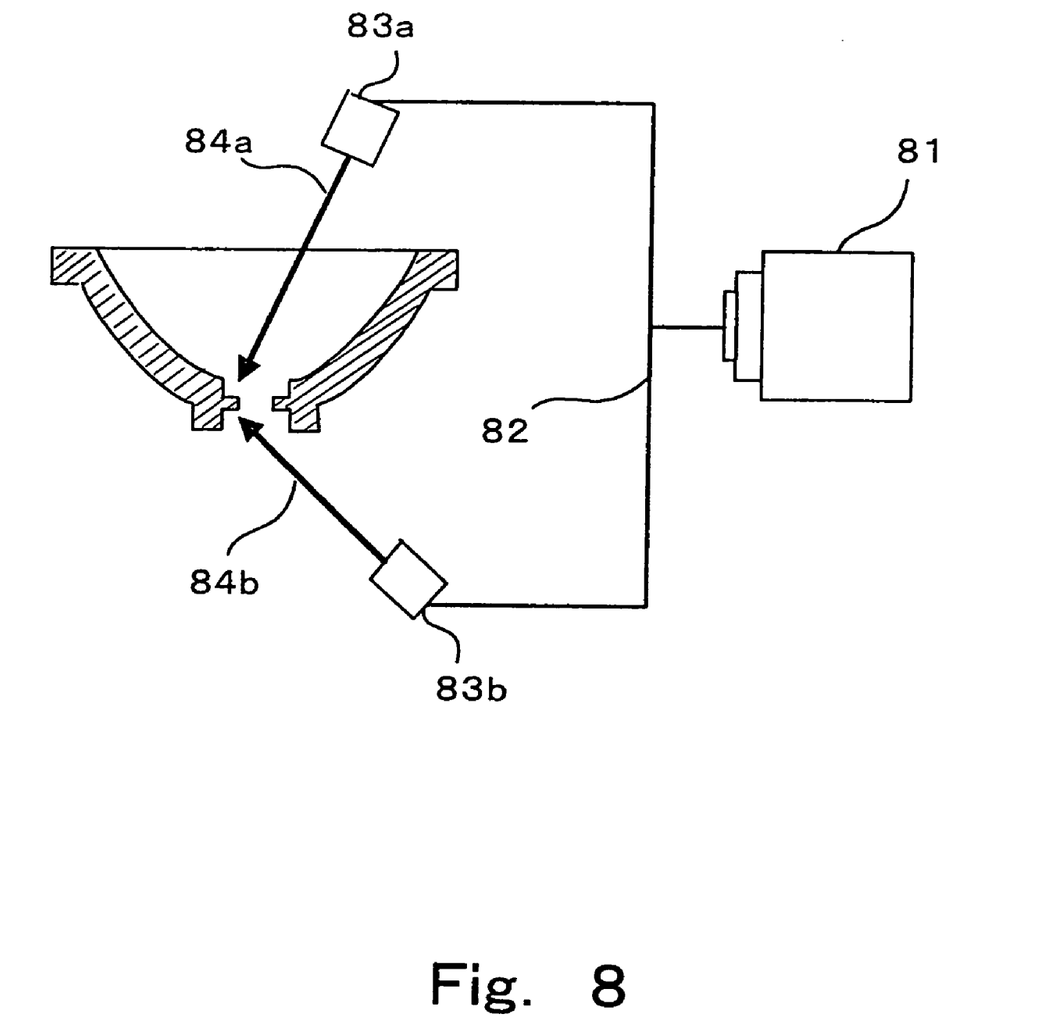
FIG. 8 is a drawing showing the constitution when the section is heat-treated by a laser beam in other embodiments of the present invention.

In this case, as shown in FIG. 8, for example, a laser beam emitted from a carbon dioxide laser 81 is led to laser emission units 83$a$ and 83$b$ via a light leading system 82 and laser beams 84$a$ and 84$b$ are radiated to the end of the opening part (ridgeline) remaining in the drilled part in the two directions. At this time, the radiation directions can be controlled to radiate the laser beams along the opening shape. Further, when the opening shape is circular, the radiation point is fixed, and the reflector is rotated around the optical axis thereof, thus the heat treatment can be easily carried out throughout the entire periphery of the opening.

When the heat treatment is to be carried out by a laser beam, the heating range becomes local more than that by fire polishing, thus there is an advantage of reducing the effect on the reflective surface.

Further, when the end of the neck is to be cut to make an opening like Embodiment 3, a laser beam may be radiated to the section from behind.

Further, amorphous glass used in the present invention may have a thermal expansion coefficient of 30 to $45\times10^{-7}/°$ C. When the thermal expansion coefficient is lower than $30\times10^{-7}/°$ C., the molding capacity is decreased and in a reflector requiring an accurate reflective surface, the yield rate is reduced. Further, when the thermal expansion coefficient is higher than $45\times10^{-7}/°$ C., the heat resistance is not sufficient and the amorphous glass cannot be combined with a high-output light source. Amorphous glass of the present invention more preferably has a thermal expansion coefficient of 30 to $40\times10^{-7}/°$ C. Concretely, in addition to borosilicate glass used in the aforementioned embodiments, aluminosilicate glass can be suitably used.

According to the present invention, since mechanical damage due to the opening-drilling process is removed, although amorphous glass is used, there is an effect that a highly heat-resisting reflector free of cracking can be obtained.

Further, the reflector according to the present invention uses amorphous glass, so that there are no deformation and shrinkage due to the crystallization process which cannot be avoided in glass-ceramic glass and the accuracy of the reflective surface can be brought closer to that of an ideal surface. Therefore, there is an effect that a reflector that the projection intensity of illumination is high and the difference in intensity of illumination between the central part and the peripheral part is small, that is, a reflector suitable for a projector light source can be obtained.

This kind of reflector is provided with a means for coating a dielectric multi-layer for reflecting visible rays and transmitting infrared rays on the reflective surface and preventing a radiated article from heating by infrared rays. Therefore, infrared rays emitted from the light source transmit the multi-layer and pass through the substrate of the reflector. However, in glass-ceramic glass, infrared rays are scattered on the crystalline interface, so that in the frame of the projector, the periphery of the reflector is apt to be filled with heat. On the other hand, amorphous glass transparent to infrared rays transmits infrared rays linearly without scattering them, so that there is an advantage that an intensive heat dissipation measure can be easily taken on the rear of the reflector.

According to the present invention, a glass reflector suitable for a projector in which the heat resistance is high and the reflection accuracy is superior and which is inexpensive and a manufacturing method for it can be obtained.

What is claimed is:

1. A reflector made of glass for a projector comprising amorphous glass having a thermal expansion coefficient of 30 to $45\times10^{-7}/°$ C. and including a reflective surface for reflecting light emitted from a light source and an opening for inserting a light source bulb or a conductor to said light source bulb, wherein said opening is smoothed by heat-treating the surface thereof after opening-drilling, thus mechanical damage is removed from a processed part.

2. A reflector made of glass for a projector according to claim 1, wherein said opening is smoothed by applying a flame by a burner.

3. A reflector made of glass for a projector according to claim 2, wherein the mean roughness of said smoothed opening is 0.03 $\mu$m or less.

4. A reflector made of glass for a projector according to claim 1, wherein said opening is smoothed by applying a flame by a burner and the mean roughness of said smoothed surface opening is 0.03 $\mu$m or less.

5. A reflector made of glass for a projector according to claim 4, wherein said reflective surface is in a shape of a rotational elliptical surface or a rotational parabolic surface and the surface accuracy in the neighborhood of said opening is less than $\pm20$ $\mu$m for an ideal curved surface.

6. A reflector made of glass for a projector according to claim 1, wherein said opening is smoothed by radiation of a laser beam.

7. A reflector made of glass for a projector according to claim 6, wherein said reflective surface is in a shape of a rotational elliptical surface or a rotational parabolic surface and the surface accuracy in the neighborhood of said opening is less than ±20 μm for an ideal curved surface.

8. The reflector according to claim 1, wherein said amorphous glass is a borosilicate glass or an aluminosilicate glass.

9. The reflector according to claim 1, wherein a composition of said amorphous glass is approximately 80.9% $SiO_2$, 2.3% $Al_2O_3$, 4% $Na_2O$, and 12.7% $B_2O_3$.

10. The reflector according to claim 1, wherein a composition of said amorphous glass is approximately 78% $SiO_2$, 2.1% $Al_2O_3$, 5.2% $Na_2O$, and 14.5% $B_2O_3$.

11. The reflector according to claim 1, wherein said opening is defined as a region from an end of the opening to about 20 mm from the end of the opening in a radial direction.

12. A reflector made of glass for a projector comprising amorphous glass having a thermal expansion coefficient of 30 to 40×10$^{-7}$/° C. and including a reflective surface for reflecting light emitted from a light source and an opening for inserting a light source bulb or a conductor to said light source bulb, wherein said opening is smoothed by applying a flame to the surface thereof by a burner after opening-drilling and the mean roughness of said smoothed surface is 0.03 μm or less.

13. A reflector made of glass for a projector according to claim 12, wherein said reflective surface is in a shape of a rotational elliptical surface or a rotational parabolic surface and the surface accuracy in the neighborhood of said opening is less than ±20 μm for an ideal curved surface.

14. A glass reflector with heat-resistance for a projector, comprising:

a curved reflective surface portion for reflecting light emitted from a light source bulb; and an opening portion drilled through the curved reflective surface portion to insert the light source bulb or a conductor to the light source bulb, wherein the glass reflector is made of amorphous glass with thermal expansion coefficient of 30 to 45×10$^{-7}$/° C., and the opening portion has a fire-polished surface with a mean roughness of 0.03 μm or less without mechanical damage.

15. A glass reflector with heat-resistance for a projector according to claim 14, wherein an operating temperature of the curved reflective surface portion and the opening portion is approximately 450° C.

* * * * *